US012096863B2

(12) United States Patent
Cooper et al.

(10) Patent No.: US 12,096,863 B2
(45) Date of Patent: Sep. 24, 2024

(54) ACCESS SYSTEM

(71) Applicants: University of Pittsburgh—Of the Commonwealth System of Higher Education, Pittsburgh, PA (US); The United States Government as Represented by the Department of Veterans Affairs, Washington, DC (US)

(72) Inventors: Rory Alan Cooper, Gibsonia, PA (US); Michael A. Shulock, Murrysville, PA (US); Joshua D. Brown, Pittsburgh, PA (US); Garrett G. Grindle, Pittsburgh, PA (US); Benjamin Todd Gebrosky, Gibsonia, PA (US); Sayeedur Rahman, Issaquah, WA (US); Sivan Almosnino, Snoqualmie, WA (US); Lisa Garamella, Charlotte, NC (US); Daniel Robin, Seattle, WA (US)

(73) Assignees: University of Pittsburg—Of the Commonweath System of Higher Education, Pittsburgh, PA (US); The United States Government as represented by the Department of Veterans Affairs, Washington, DC (US)

( * ) Notice: Subject to any disclaimer, the term of this patent is extended or adjusted under 35 U.S.C. 154(b) by 325 days.

(21) Appl. No.: 17/462,462

(22) Filed: Aug. 31, 2021

(65) Prior Publication Data

US 2022/0061536 A1 Mar. 3, 2022

Related U.S. Application Data

(60) Provisional application No. 63/072,591, filed on Aug. 31, 2020.

(51) Int. Cl.
*A47C 1/024* (2006.01)
*A47C 1/025* (2006.01)
(Continued)

(52) U.S. Cl.
CPC .............. *A47C 7/62* (2013.01); *A47C 1/0242* (2013.01); *A47C 1/025* (2013.01); *A47C 3/20* (2013.01);
(Continued)

(58) Field of Classification Search
CPC ....... A47C 7/62; A47C 7/5064; A47C 1/0242; A47C 1/025; A47C 3/20; A61G 5/128;
(Continued)

(56) References Cited

U.S. PATENT DOCUMENTS 4,953,664 A 9/1990 Vrooman
5,690,185 A 11/1997 Sengel
(Continued)

*Primary Examiner* — Nkeisha Smith
(74) *Attorney, Agent, or Firm* — BARTONY & ASSOCIATES LLC

(57) ABSTRACT

An access system includes a laterally extending frame, a carriage in operative connection with the laterally extending frame and including a drive to move the carriage laterally on the frame, a seat support attached to the carriage including a seat assembly interface and a lift to raise and lower the seat assembly interface within a range of positions, a seat assembly attached to the seat assembly interface, a controller in operative connection with the drive of the carriage and the lift of the seat support via which the position of the seat support is controllable, and a controller interface in operative connection with the controller.

20 Claims, 10 Drawing Sheets

(51) Int. Cl.

| | |
|---|---|
| ***A47C 3/20*** | (2006.01) |
| ***A47C 7/50*** | (2006.01) |
| ***A47C 7/62*** | (2006.01) |
| ***A61G 5/04*** | (2013.01) |
| ***A61G 5/10*** | (2006.01) |
| ***A61G 5/12*** | (2006.01) |

(52) U.S. Cl.
CPC .............. *A47C 7/5064* (2018.08); *A61G 5/04* (2013.01); *A61G 5/1059* (2013.01); *A61G 5/1067* (2013.01); *A61G 5/128* (2016.11); *A61G 2200/34* (2013.01)

(58) Field of Classification Search
CPC ...... A61G 5/04; A61G 5/1059; A61G 5/1067; A61G 2200/34
USPC ............ 248/429; 297/445.1, 188.08, 188.09, 297/248, 311, 331, 337, 338
See application file for complete search history.

(56) References Cited

U.S. PATENT DOCUMENTS

| | | | | |
|---|---|---|---|---|
| 6,692,051 | B1 | 2/2004 | Cook | |
| 7,322,653 | B2 | 1/2008 | Dragusin | |
| 7,452,019 | B1 * | 11/2008 | Day | B60N 2/309 297/344.13 |
| 7,850,242 | B2 * | 12/2010 | Taguchi | B60N 2/146 297/344.23 |
| 8,033,589 | B2 * | 10/2011 | Kusanagi | B60N 2/045 296/68.1 |
| 8,565,982 | B2 * | 10/2013 | Lofstrand | F16M 11/20 280/35 |
| 9,403,448 | B1 * | 8/2016 | Evans | B60W 10/06 |
| 9,452,691 | B2 * | 9/2016 | Löfstrand | B60N 2/02246 |
| 9,994,130 | B2 * | 6/2018 | Michels | B60N 2/062 |
| 10,624,508 | B2 * | 4/2020 | Duarte | A47K 13/28 |
| 10,973,343 | B2 * | 4/2021 | Jacobs | A47C 1/0355 |
| 11,110,823 | B2 * | 9/2021 | Lee | B60N 2/08 |
| 11,679,694 | B2 * | 6/2023 | Zhao | B60N 2/0875 248/429 |
| 2007/0216131 | A1 | 9/2007 | Potappel | |
| 2010/0066146 | A1 * | 3/2010 | Weber | B60N 2/162 297/340 |
| 2014/0138997 | A1 * | 5/2014 | Schulz | B60N 2/07 297/344.24 |
| 2015/0108807 | A1 * | 4/2015 | Wallace | A47C 1/11 297/338 |
| 2015/0284094 | A1 * | 10/2015 | Bendele | B64D 11/0648 297/391 |
| 2018/0289148 | A1 * | 10/2018 | Maynes | A47B 17/065 |
| 2021/0030158 | A1 * | 2/2021 | Newman | A47C 7/626 |
| 2022/0371475 | A1 * | 11/2022 | Dillinger | B60N 2/14 |
| 2023/0041032 | A1 * | 2/2023 | Jung | B60N 2/02246 |
| 2023/0044679 | A1 * | 2/2023 | Jung | B60N 2/68 |
| 2023/0052454 | A1 * | 2/2023 | Moon | B60N 2/01583 |

* cited by examiner

ACCESS SYSTEM

CROSS-REFERENCE TO RELATED APPLICATIONS

This application claims benefit of U.S. Provisional Patent Application Ser. No. 63/072,591, filed Aug. 31, 2020, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

The enactment of the Americans with Disabilities Act (ADA) created more opportunities for people with disabilities to find gainful employment. One of the most important changes, but least understood, is workplace accommodations. The ADA Access Guidelines provide specifications for office space and desk accessibility. However, such specification presumes that people with disabilities work in offices or wish to work only in offices. Because of changes in the economy there is job creation in retail sectors including direct sales and in distribution centers. Jobs in the retail sector create opportunity for people with disabilities, but new technologies are needed to make them accessible.

According to at least one study, in 2016 around 370,000 people between the ages of 21-64 with ambulatory disabilities were not working but actively looking for work out of a total population of around 7 million. Additionally, employees on Workman's Compensation with temporary, lower extremity injuries that be able to return to work from a seated position, if such an accommodation was available. Employment is often viewed as a critical part of life and provides numerous financial, and psychosocial benefits. Unemployment rates for working age people with mobility impairments (defined as those looking for work but not finding it) are approximately double those without disabilities. It has been shown that non-working people with disabilities do want to work and place a similar importance upon work as people without disabilities. Literature suggests that environmental factors contribute to barriers to employment and participation for people with disabilities. With growing popularity of internet-based purchases, the number of people working in e-commerce is growing, with many of these positions requiring only on-the-job training. However, many of these positions are not accessible to people with mobility impairments.

There are currently a number of technologies for making a workstation or work cell accessible to people with disabilities. However, all such technologies have several significant shortcomings that make many types of work essentially impossible: A number of powered wheelchairs include the capability of power seat elevation. However, such an option is not covered by most insurers. Powered seat elevation also reduces the ability to reach forward, left, and right and does not provide the ability to strafe, translate laterally or move side to side. That limitation necessitates a large floor space for activities, which is not feasible in many, if not most, work environments with the possible exception of office work. A common workplace accommodation is a powered high-low workstation center that allows a wheelchair user to roll under it with the desk at the appropriate work platform height. This type of workstation can also be used for people at standing height. Unfortunately, such a workstation limits the type of work that a person can perform to essentially desk or bench work. A lift table or elevatable platform can also be used to provide accommodations to work for people who are seated or who must remain in their own wheelchair. The challenges are much the same as with a powered wheelchair with powered seat elevation in that reach is limited and there is no capability to translate laterally or moved side to side while maintaining the seat position. Further, safety rails and hand holds are needed to ensure that the elevated person does not fall from the platform.

SUMMARY

In one aspect, an access system includes a laterally extending frame, a carriage in operative connection with the laterally extending frame and including a drive to move the carriage laterally on the frame, a seat support attached to the carriage including a seat assembly interface and a lift to raise and lower the seat assembly interface within a range of positions, a seat assembly attached to the seat assembly interface, a controller in operative connection with the drive of the carriage and the lift of the seat support via which the position thereof (that is, the position of the seat support) is controllable, and a controller interface in operative connection with the controller. In a number of embodiments, the seat assembly comprises a safety belt system (including, for example, a seat belt and/or a shoulder harness).

The seat support may, in a number of embodiments, include a foot rest interface and a foot rest attached to the foot rest interface via an extending member. The foot rest may, for example, be adjustable in position via adjustment of a length of the extending member (for example, telescopically) and adjustment of an angle of the extending member relative to the seat support via the foot rest interface.

In a number of embodiments, the seat support includes a lower frame attached to the carriage and an upper frame attached to the seat assembly interface. The lower frame and the upper frame may be connected by the lift. In a number of embodiments, the lift of the seat support comprises a scissor lift.

In a number of embodiments, the laterally extending frame includes a first laterally extending member and a second laterally extending member spaced from the first laterally extending member upon with the carriage is laterally movable. At least one of the laterally extending members may, for example, include a rack gear which cooperates with a gear attached to the carriage. The gear attached to the carriage may, for example, be in operative connection with the drive (for example, a manual or powered drive).

The laterally extending frame may, for example, include adjustable feet or legs. The laterally extending frame may, for example, be supported by the adjustable feet above a surface contacted by the adjustable feet so that the system may be moved via a mobile lift system.

In a number of embodiments, the seat assembly is pivotably attached to the seat assembly interface. The seat assembly may, for example, include a seat section and a backrest section. The position of the seat section and the backrest section may, for example, be adjustable in position and in relative angle therebetween. The position of the seat section and the backrest section are adjustable in position and in relative angle therebetween in a powered manner.

The system or a portion thereof may, for example, be powered via electricity and the system further comprises an uninterruptable power supply with battery back-up unit. The system or portions thereof may, for example, also or alternatively be powered manually, hydraulically, or pneumatically.

The controller may, for example, include a processor system and a memory system in operative connection with the processor system. A control algorithm may, for example, be stored in the memory system and be executable by the processor system. The control algorithm may, for example, include programmed states for at least one of the carriage, the seat support, and the seat assembly. In a number of embodiments, the control algorithm includes a programmed home state which, when executed, positions the seat support and the seat assembly in a state for exit therefrom by a user. The control algorithm may, for example, include at least one programmed work state which, when executed, positions the seat support and the seat assembly in a state for performance of one or more tasks.

In another aspect, a method of providing access to a workstation includes positioning a laterally extending frame of an access system in a position at the workstation, controlling the position of a carriage in operative connection with the laterally extending frame and comprising a drive to move the carriage laterally on the frame, and controlling a lift of a seat support attached to the carriage to which a seat assembly is attached to raise and lower the seat assembly interface within a range of positions.

The present devices, systems, methods, and compositions, along with the attributes and attendant advantages thereof, will best be appreciated and understood in view of the following detailed description taken in conjunction with the accompanying drawings.

DETAILED DESCRIPTION

Figure 1A:
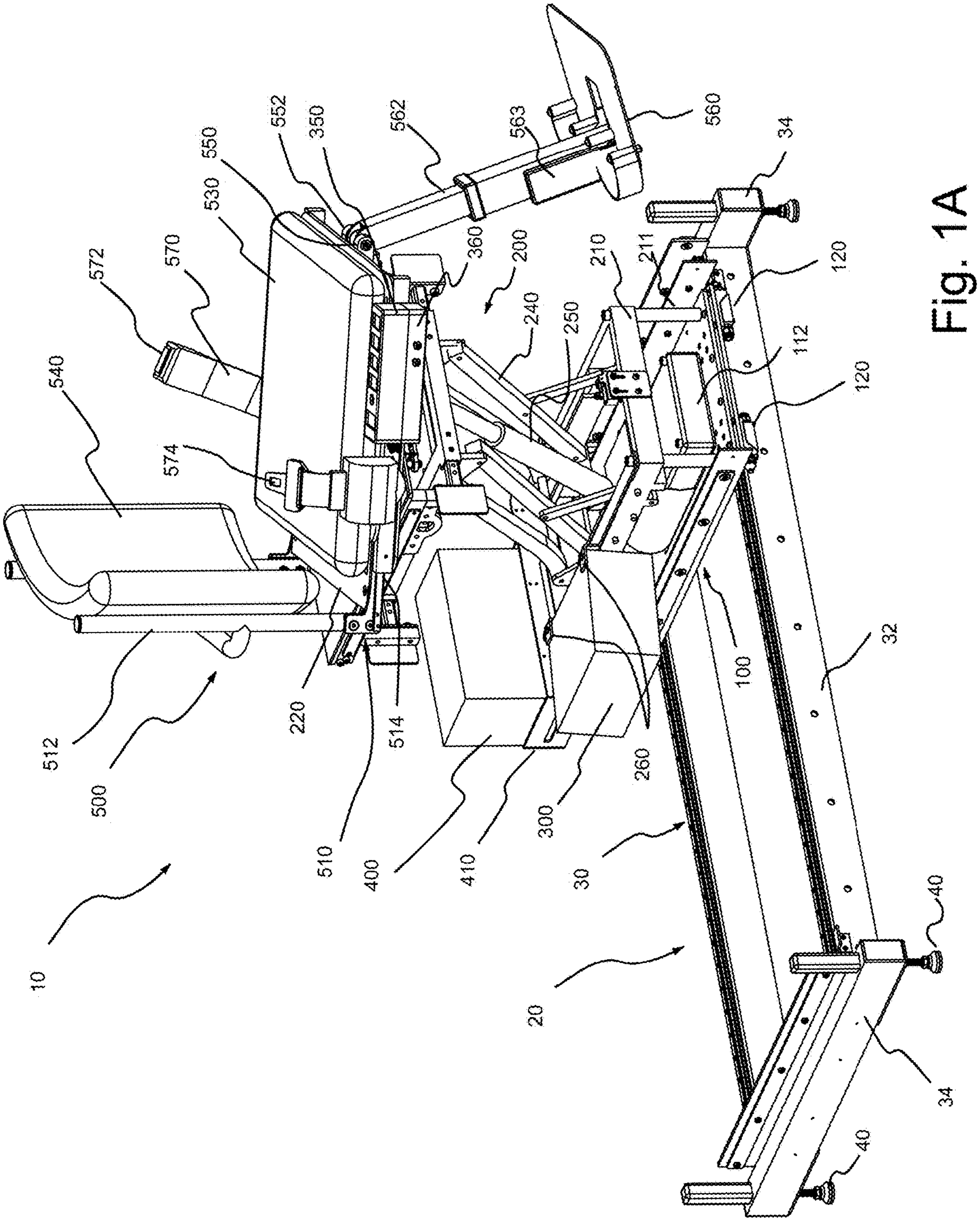
FIG. 1A illustrates an isometric view of an embodiment of a workstation access system or robot hereof wherein a seat thereof is in its highest position and translated to a first side of the system.
Figure 1B:
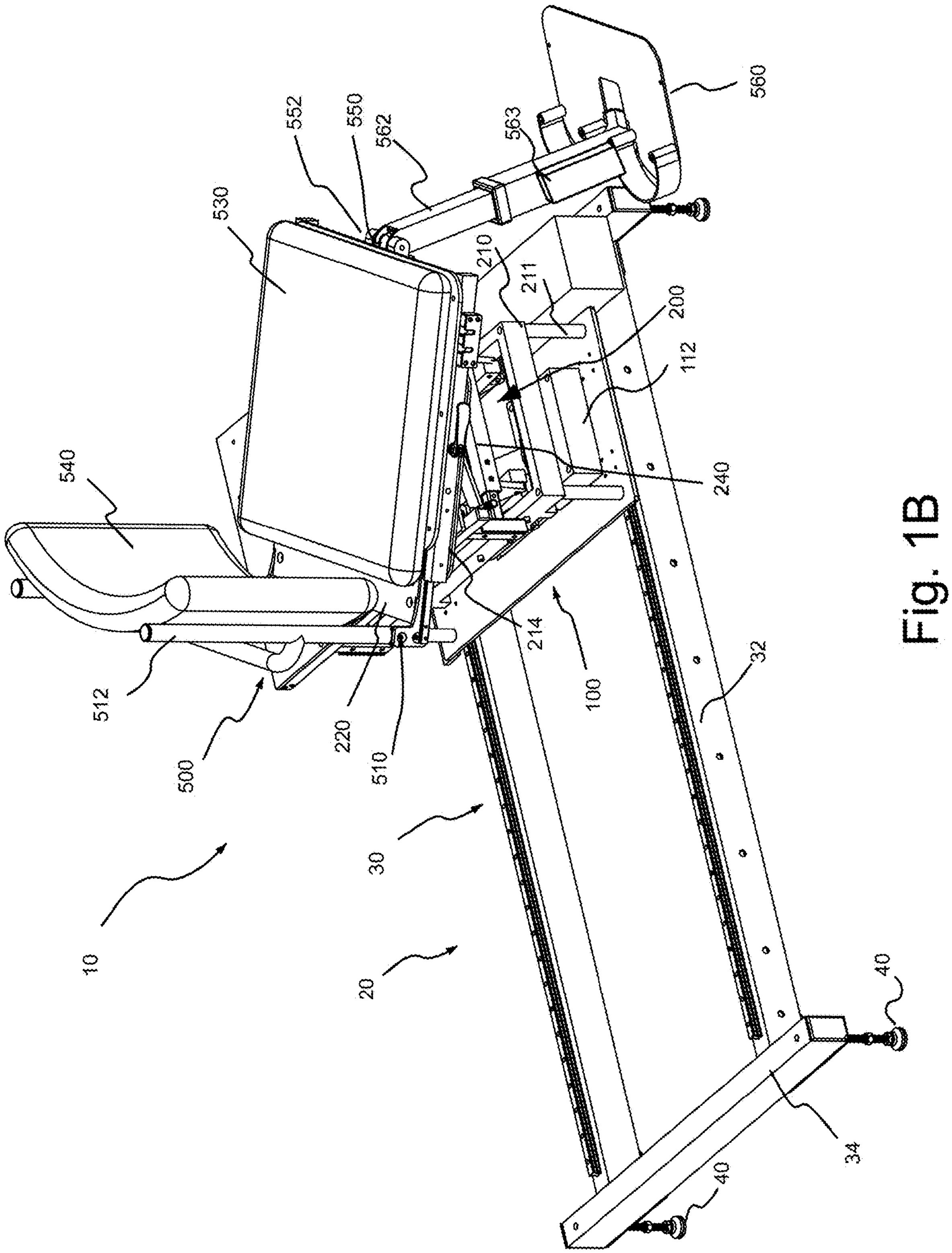
FIG. 1B illustrates an isometric view of the workstation access system of FIG. 1A with the seat thereof lowered to its lowest position and translated to the first side of the system.
Figure 1C:
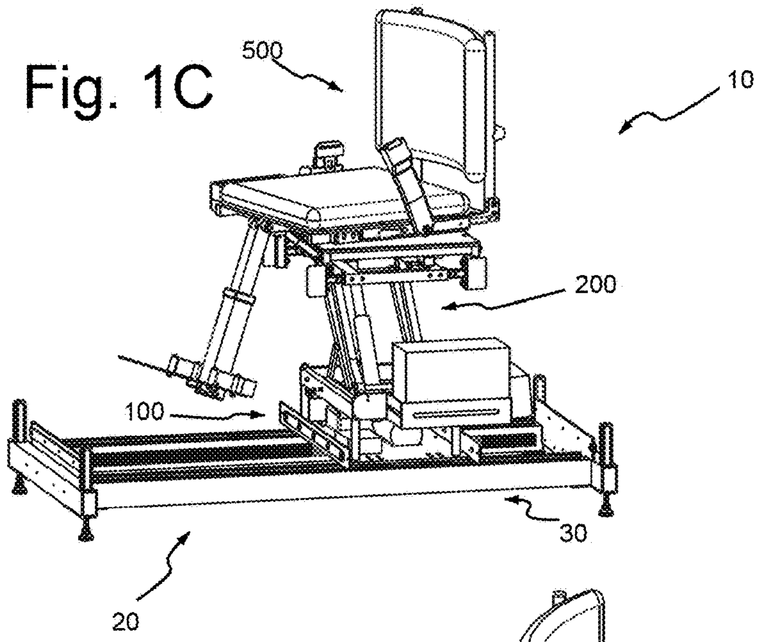
FIG. 1C illustrate an isometric view of the workstation access system of FIG. 1A with the seat carriage thereof translated to another position.
Figure 1D:
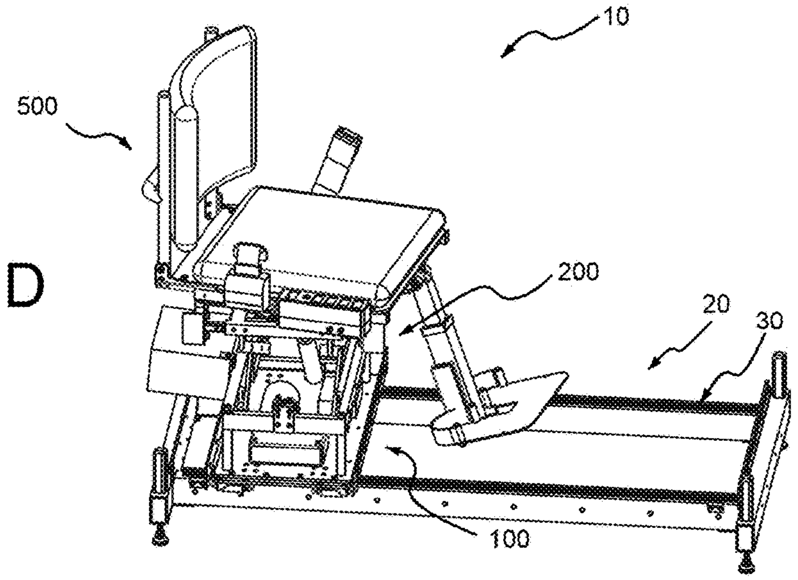
FIG. 1D illustrate an isometric view of the workstation access system of FIG. 1A with the seat carriage thereof translated to a further position.
Figure 1E:
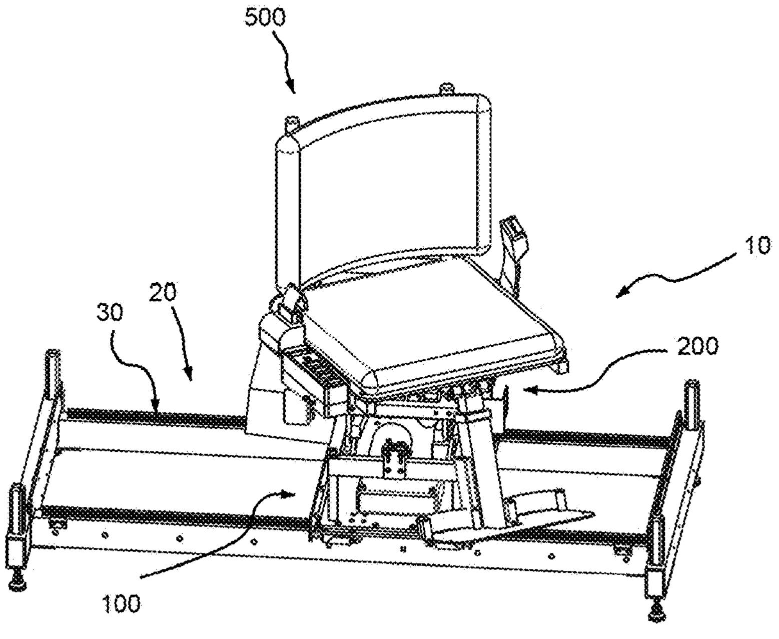
FIG. 1E illustrate an isometric view of the workstation access system of FIG. 1A with the seat carriage thereof translated to still a further position, wherein not all elements are labeled in FIGS. 1C through 1E for clarity.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a processor" includes a plurality of such processors and equivalents thereof known to those skilled in the art, and so forth, and reference to "the processor" is a reference to one or more such processors and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The terms "electronic circuitry", "circuitry" or "circuit," as used herein include, but are not limited to, hardware, firmware, software or combinations of each to perform a function(s) or an action(s). For example, based on a desired feature or need. a circuit may include a software-controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software-controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as operational amplifiers, Digital to Analog Converters (DACs), Analog to Digital Converters (ADCs), Pulse Width Modulated (PWM) circuitry, wired serial communication (UART, SPI, USB) devices, radio frequency communication devices, random access memory (RAM), read-only memory (ROM), programmable read-only memory (PROM), erasable programmable read only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "controller," as used herein includes, but is not limited to, any circuit or device that coordinates and controls the operation of one or more input and/or output devices. A controller may, for example, include a device having one or more processors, microprocessors, or central processing units capable of being programmed to perform functions. A controller may also contain analog, discrete component, and integrated circuit blocks such as amplifiers, differentiators, integrators, oscillators, control knobs, and display devices.

The term "logic," as used herein includes, but is not limited to: hardware, firmware, software or combinations thereof to perform a function(s) or an action(s), or to cause a function or action from another element or component. Based on a certain application or need, logic may, for example, include a software controlled microprocess, discrete logic such as an application specific integrated circuit (ASIC), or other programmed logic device. Logic may also be fully embodied as software. As used herein, the term "logic" is considered synonymous with the term "circuit."

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

In a number of embodiments hereof, the workstation access devices, systems and methods hereof improve the accessibility of jobs at locations such as package fulfillment stations, fast-food counters, stadium sales booths, etc. The workstation access devices, systems and methods hereof provide an accessibility solution to allow more employment opportunities for people with mobility impairments. In that regard, there is a significant need for devices, systems and methods which are stable and provide postural support for lifting and moving items (for example, grabbing and moving small packages weighing under, for example, 10 pounds), are moveable within a work environment (for example, may be moved from one work cell to another or may be easily stored when not in use), allow for multiple degrees of freedom to move in space efficiently (for example, move up/down, translate laterally or move left/right, and rotate), are ergonomic (for example, easy to install, intuitive to control, and simple to transfer into and out of), are efficient (for example, allow people with disabilities to function at the same level of performance as their unimpaired counterparts), and are reliable (for example, operable for several years with regular maintenance and servicing). Although the access devices, system and method hereof may be used to provide or to facilitate access to a workstation and/or other spaces/areas for people with mobility disabilities, such systems may also be used to provide or to facilitate access for people without mobility disabilities.

An embodiment of a robotic seated workstation/activity interface or workstation/activity access system 10 hereof for people with disabilities is illustrated in, for example FIGS. 1A through 4. System 10 includes a base 20 which is generally rectangular in the illustrated embodiment. Base 20 may, for example, include a frame 30 fabricated from a rigid, strong material such as steel. In the illustrated embodiment, frame 30 includes generally parallel lateral extending members 32 and interconnecting end members 34. Adjustable (for example, threaded) legs or feet 40 may extend from frame 30 (from members 34 in the illustrated embodiment) to level and support system 10 on a surface. In a number of embodiments, base 20 may be provided with wheels. Such wheels may be locked or base 20 may be lowered/raised relative to the wheels so that base 20 contacts the floor in a stationary mode. In the illustrated embodiment, system 10 may, for example, be readily moved via a mobile lift system such as via the forks 600 of a pallet jack (not illustrated) or similar lift which contact an underside of frame 30 as illustrated in FIG. 5.

Figure 2:
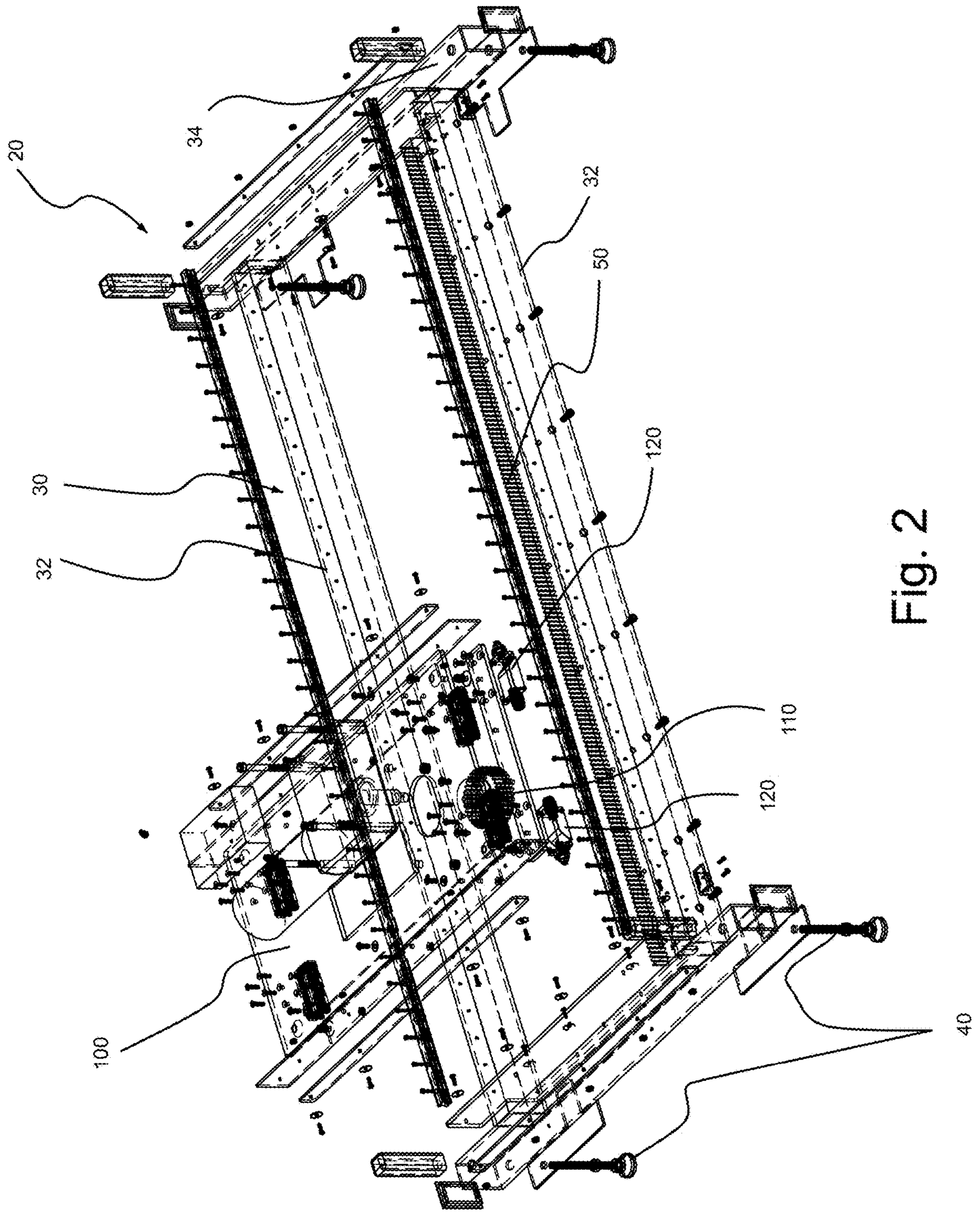
FIG. 2 illustrates an isometric, disassembled, or exploded, hidden-line view of the base or frame and a laterally translating seat carriage of the workstation access system of FIG. 1A.

As illustrated in FIG. 2, seat carriage 100 is placed in operative connection with frame 30 so that seat carriage 100 is laterally translatable or moveable on frame 30 to enable lateral translation or movement from side to side. As used herein, and in the case of a user seated in system 10, directional terms such as side to side and lateral refer to the movement of the seat, when facing a forward extending member 32, relative to frame 30 as illustrated in the figures. With respect to the environment in which system 10 is placed, and given the rotational ability of seat support 200 as described below, such lateral or side-to-side movement could be described as forward/backward or anything in between based on the angle of seat assembly 500 (described below) relative to base 20. In the illustrated embodiment (see FIG. 2), seat carriage 100 includes an electric-motor driven gear 110 (see FIG. 2) which is driven by motor 112 (see, for example, FIG. 1A). Gear 110 cooperates with a gear rack 50 on a lateral extending member 32 of frame 30 to move seat carriage 100 laterally relative to frame 30. Guide bearings 120 may be provided to facilitate translation of seat carriage 100 laterally on frame 30.

Figure 3A:
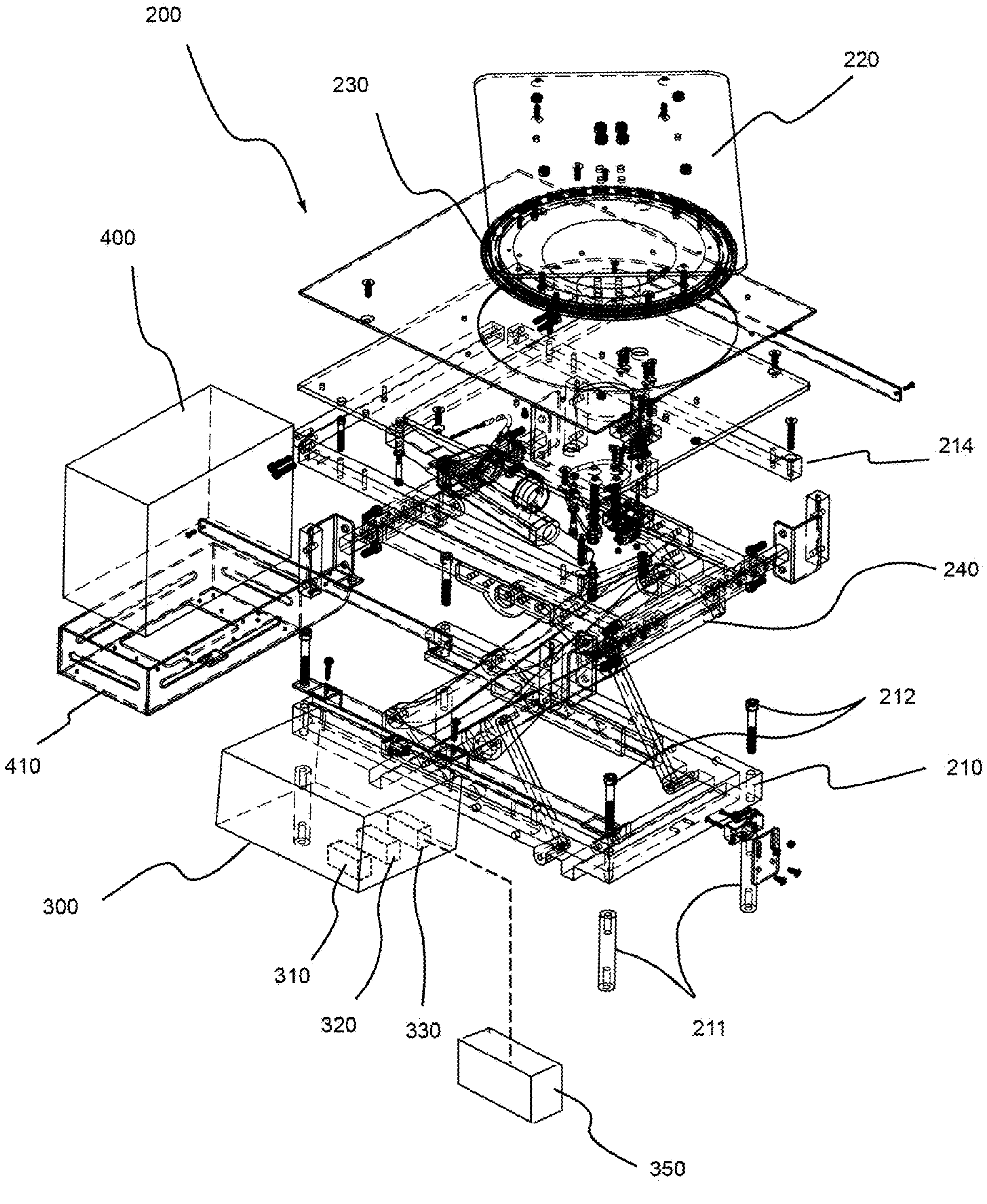
FIG. 3A illustrates an isometric, disassembled, or exploded, hidden-line view of the seat support including a lift mechanism and seat swivel of the workstation access system of FIG. 1A.
Figure 3B:
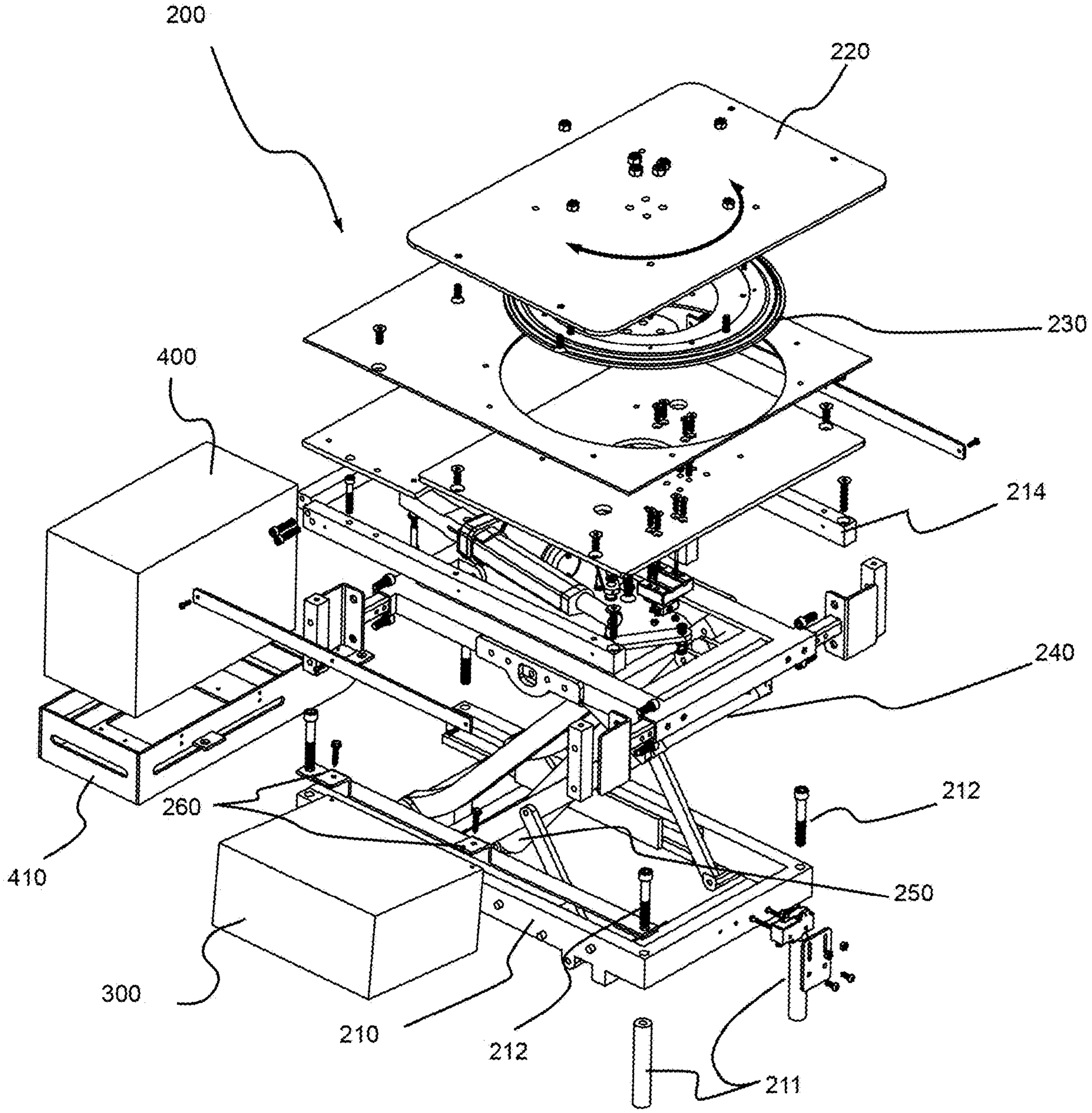
FIG. 3B illustrates an isometric, disassembled, or exploded, view of the seat support of the workstation access system of FIG. 1A.

A seat support 200 is attached to seat carriage 100. As, for example, illustrated in FIGS. 1A, 1B, 3A and 3B, seat support 200 may include a lower frame 210 which is attached to seat carriage 100 via extending members 211 and connectors such as bolts 212. A seat plate 220 is rotatably or pivotably attached to an upper frame 214 of seat support 200 via, for example, a swivel bearing 230. Thus, seat assembly 500 is readily rotatable independent of the translated and/or elevated position of seat support relative to base 20. Seat plate 220, which is attached to upper frame 214, is operatively connected to lower frame 210 via a lift mechanism 240 such as a scissor lift (as known in the lift arts) which is connected at one end to lower frame 210 and at the other end to upper frame 214. Lift mechanism 240 may, for example, be controllably operated via an electromechanically powered cylinder 250 (see, for example, FIG. 1A). Although electromechanical power is described generally for system 10 hereof, one skilled in the art will appreciate that other modes of power such as hydraulic power, pneumatic power or manual power may be used in systems hereof in connection with one or more elements thereof. As further illustrated in, for example, FIGS. 3A and 3B, a controller or control system 300 may be attached to seat support 200 via, for example, brackets 260. As illustrated in FIG. 3A, controller 300 may, for example, include a processor system 310 (for example, including one or more processors or microprocessors) and a memory system 320 in operative or communicative connection with processor system 310. Controller 300 may further include a user interface system 330 in operative or communicative connection with processor system 310. User interface system 330 may, for example, be in operative or communicative with a controller interface 350 as illustrated in FIGS. 1A and 3A, which may be handheld. As, for example, illustrated in FIG. 1A, controller interface may be seated in a seating or cradle 360 attached to seat support 200. An uninterruptable power supply with battery back-up unit 400 (see FIG. 1A) may be provided in connection with system 10 (for example, connected to seat support 200) to provide for continued operation for a period of time should line power be interrupted. In the illustrated embodiment, unit 400 is seated in a seating or cradle 410 attached to lower frame 210.

Figure 1F:
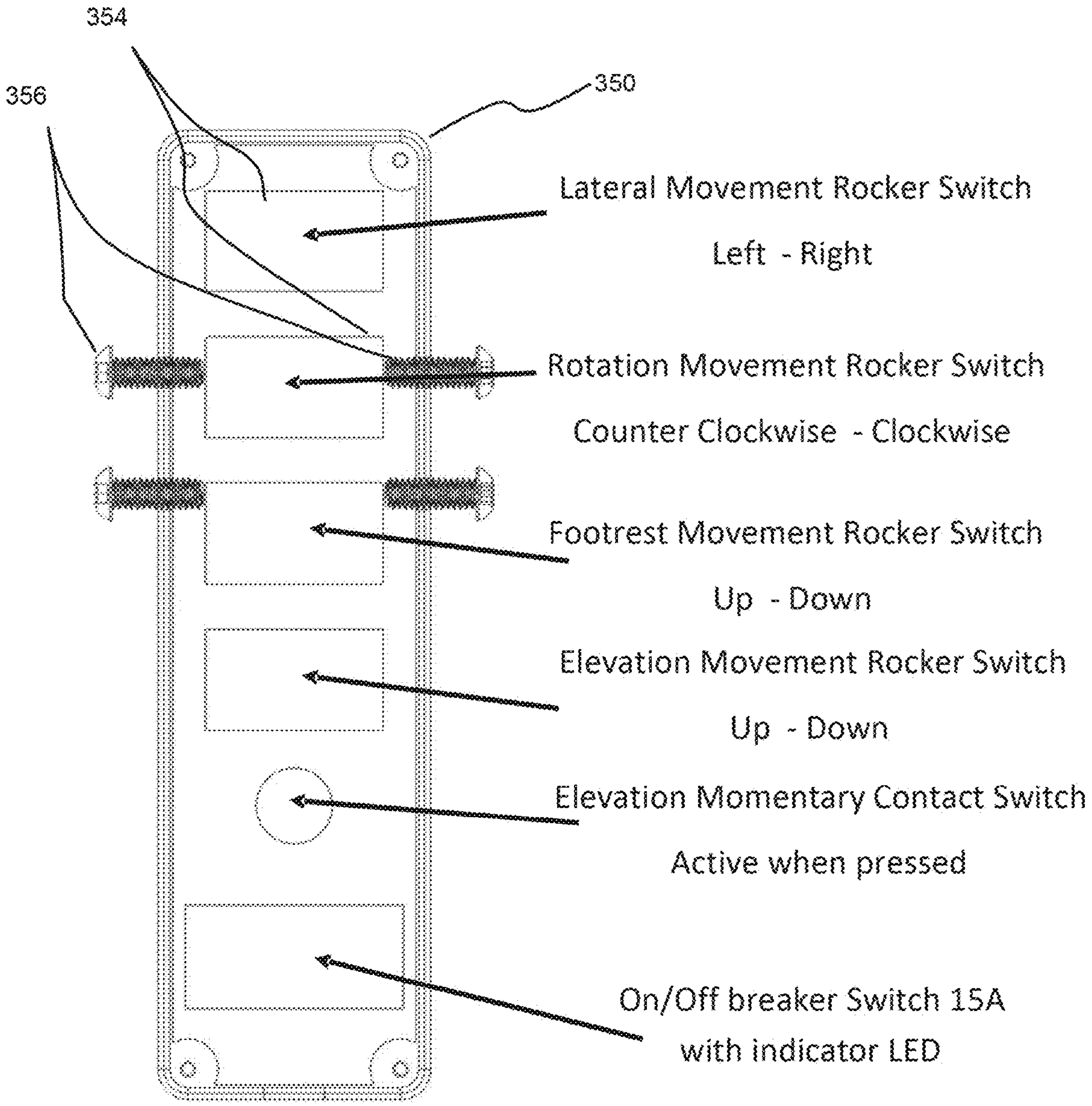
FIG. 1F illustrated an enlarged top view of a controller interface of the workstation access system of FIG. 1A.

FIG. 1F provides an enlarged top view of controller interface 350. In the illustrated embodiment, controller interface 350 includes a plurality of controls (for example, rocker switches and/or contact switches) to control the lateral position, rotational position, and elevation of a seat assembly 500 hereof. Pins 356 and/or other connectors or cooperating element may, for example, be provided to facilitate seating or docking of controller interface 350 with seating or cradle 360 and/or a pendant mount.

Figure 4:
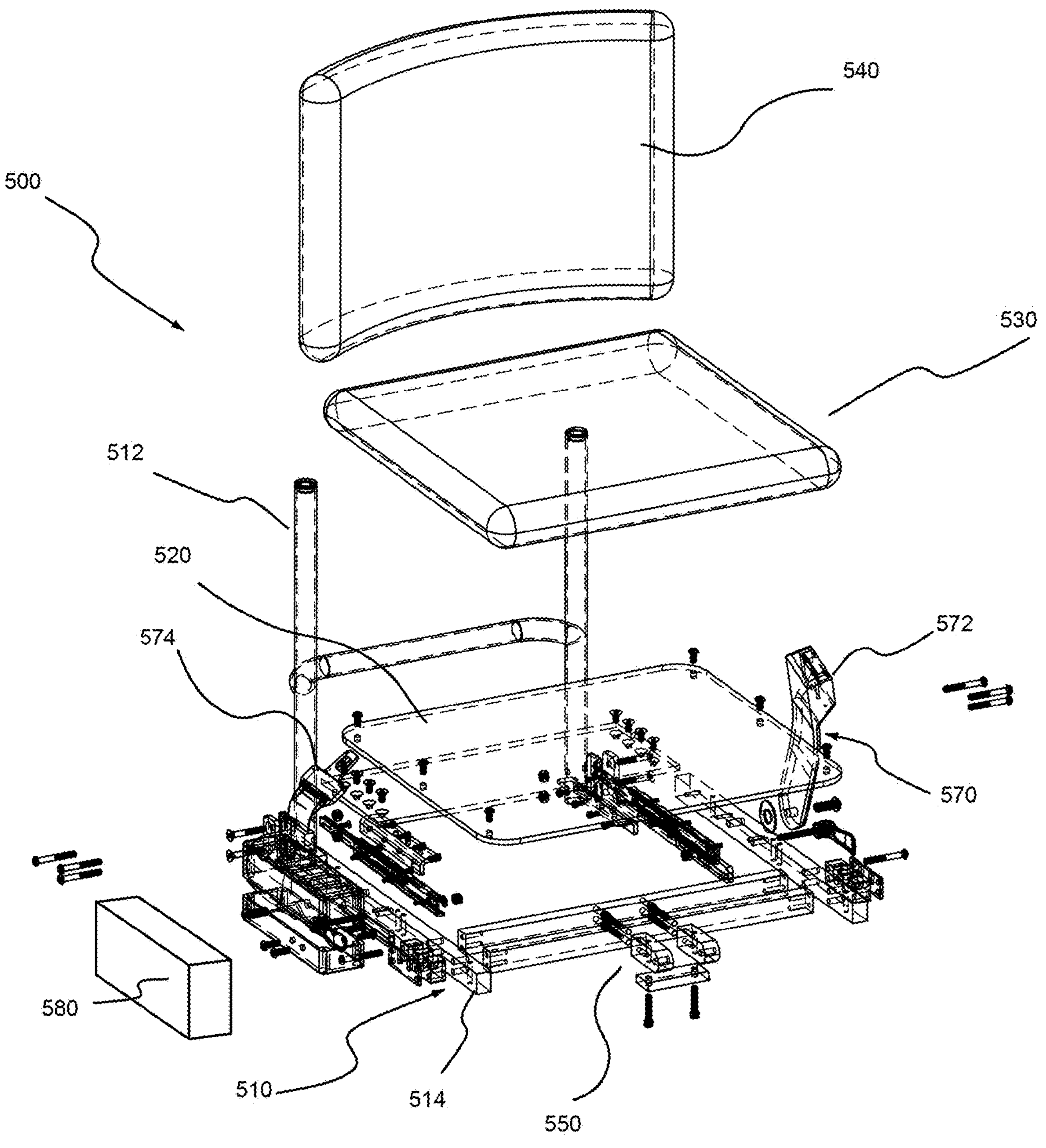
FIG. 4 illustrates an isometric, disassembled, or exploded, hidden-line view of the seat assembly of the workstation access system of FIG. 1A.
Figure 5:
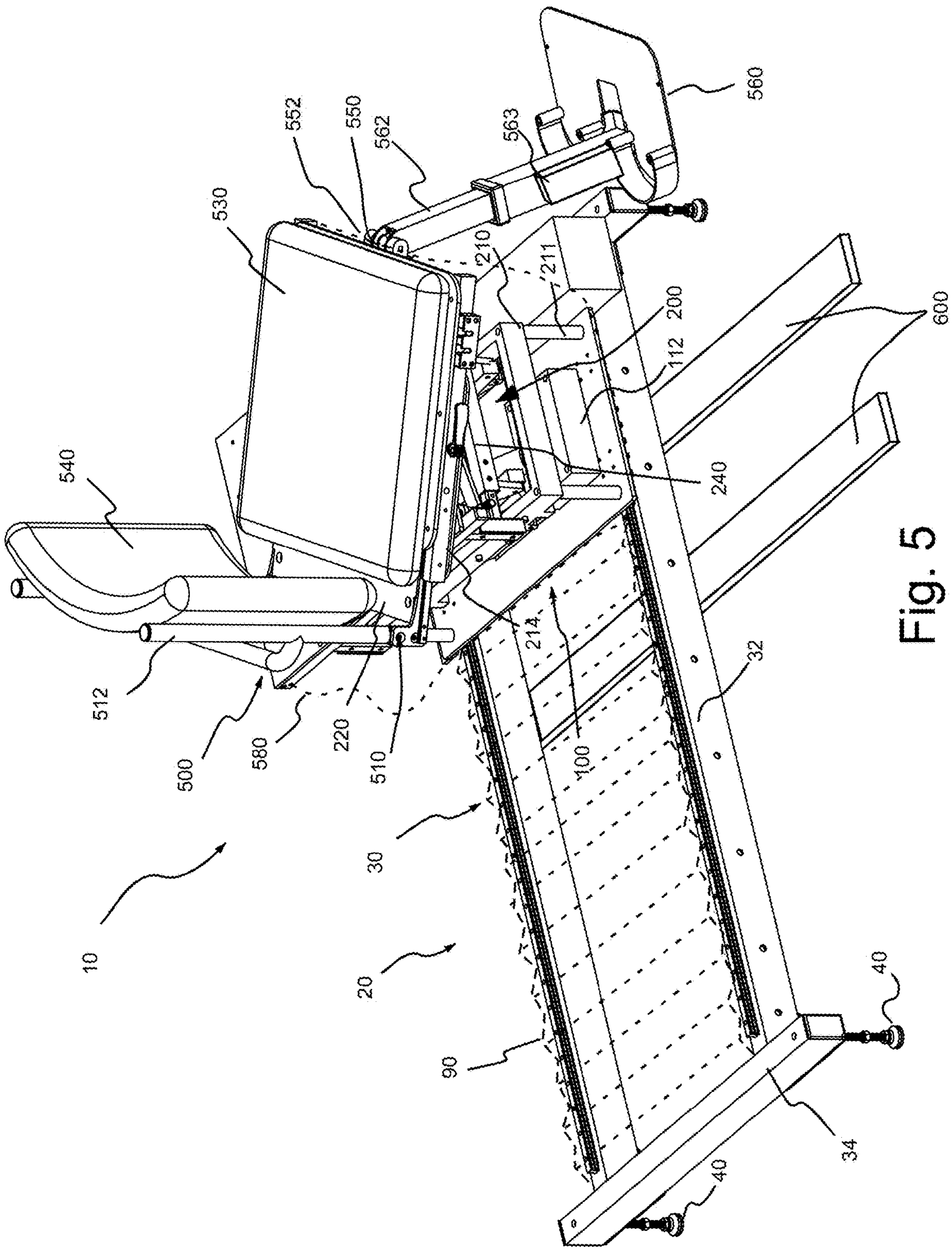
FIG. 5 illustrates the forks of a pallet jack (shown in broken lines) positioned under the base of a workstation access system hereof to lift and move the workstation access system.
Figure 6:
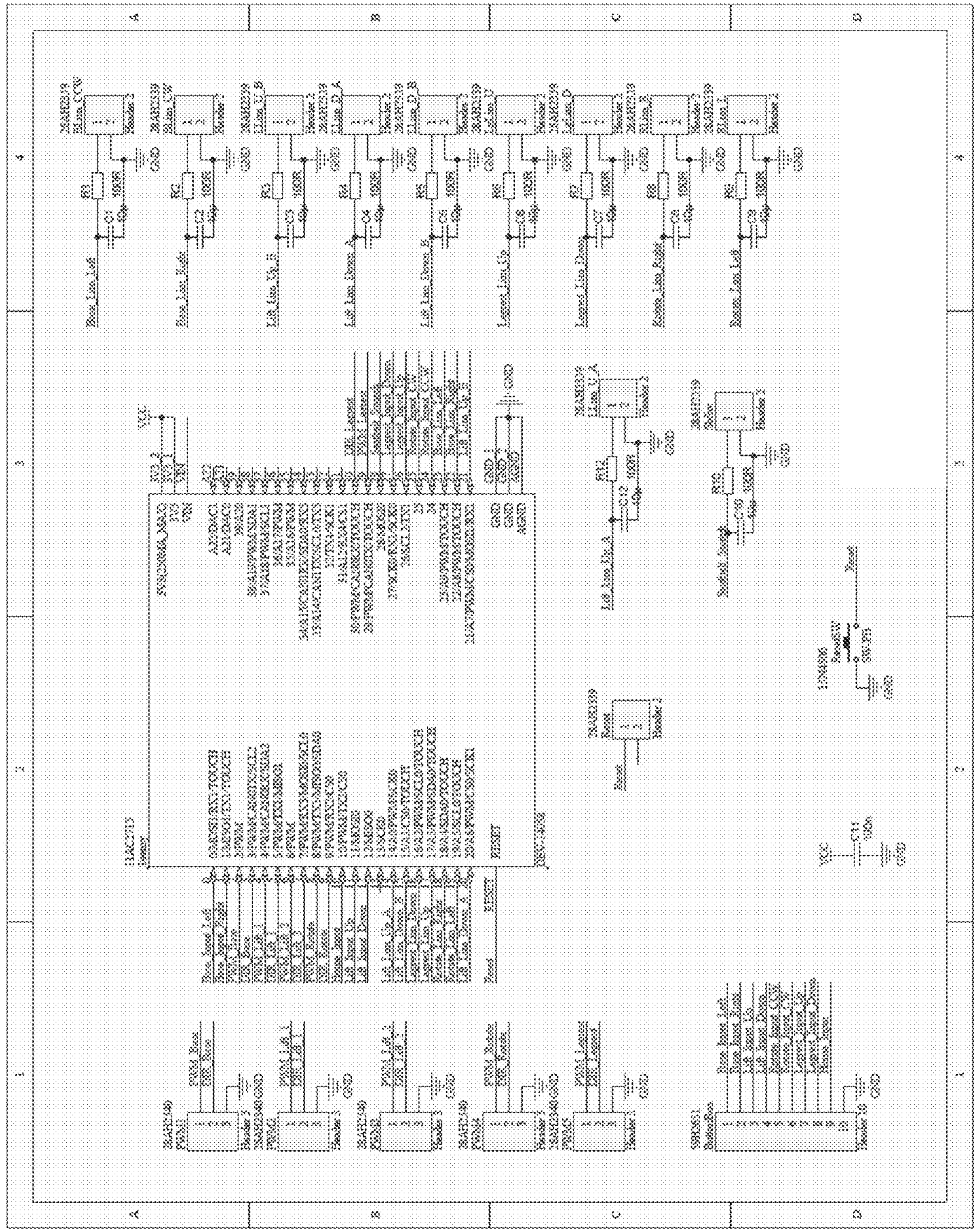
FIG. 6 illustrates an embodiment of a schematic for a printed control board or PCB for a controller of a workstation access system hereof.

An embodiment of a seat assembly 500 is illustrated, for example, in FIG. 4. Seat assembly 500 is, for example, attachable to seat plate 220 of seat support 200 as illustrated in FIG. 1A. Seat assembly 500 includes a seat frame 510 to which a seating plate 520 (which may support a seat cushion 530, and which may be combined into seat plate 220) is attached. A seat cushion 530 and a backrest 540 are attachable to seating frame 510 (which includes a backrest section or portion 512 and a seat section of portion 514) as known in the seating arts. A footrest mount 550 is also attached to seat frame 510 in the illustrated embodiment. Footrest 560 is illustrated, for example, in FIG. 1A and may be attached to mount 550 via an adjustable (for example, telescoping) extending member 562. Further, a safety belt or safety belt system including, for example, a lap or seat belt 570 (which includes a female connector 572 and a male connector 574 as known in the safety belt arts) may be provided in operative connection with seat frame 510.

In a number of embodiments of system 10, leg or footrest length is adjustable in a powered manner via a power system such as electric motor 563 (represented schematically in FIGS. 1A and 1B) or manually via telescoping extending member 562. Moreover, leg-rest angle may be adjustable in a powered manner or manually via mount 550 which may, for example, include a locking element 552 (for example, a threaded locking element) which may be loosened to adjust the angle of extending member 562 and subsequently tightened to lock such an angle (in either a powered or manual manner; see FIG. 1A).

Seat depth, backrest angle, seat tilt and backrest height may be electromechanically, hydraulically, pneumatically or mechanically adjustable individually or as a set to accommodate people of different sizes and for various work activities, for example, via, for example, the adjustment of the position and/or the relative position of backrest portion 512 and seat portion 514 of seating frame 510 (and/or adjustment of seat plate 520 relative to seating frame 510). In general, seat assembly 500 provide a backrest section and a seat section that are adjustable in position as a unit or relative to each other. In addition to facilitating a working position, seat adjustments may be made as needed or in a programmed manner to achieve pressure relief to assist in preventing pressure related ulcers. In the representative embodiment of FIG. 4, such adjustments can be independently made via an electric motor/drive system 580, which is illustrated schematically in FIG. 4. Seat positions or settings (for example, leg-rest length, leg-rest angle, seat depth, backrest angle, and backrest height) can be stored in controller memory system 320 to quickly select values for individual preferences or functional needs. Such setting values may be set each day, for a period of time or during the course of a day or other period of time. Different setting values may, for example, accommodate multiple people using the same workstation access system 10 over the course of a day, week or other period of time (for example, in different shifts). For example, person A may have personal settings and person B may have a different set of personal setting which are retrievable/executable via the touch of the button, whereby system 10 may switch between the two settings. Although settings for two persons are discussed as a representative example, there may be a plurality of seating settings for many more than two persons. Further, such set settings may be additionally programmed for specific work task requirements.

Additionally, seat assembly 500 may be rotatable manually and/or under power (for example, via motor/drive system 580). In a number of embodiments, drive system 580 included a linear actuator in operative connection with cam. In a number of embodiments, a range 180 degrees rotation was provided at a rotation speed such that 180 degrees rotation could be achieved in 10 seconds or less. Moreover, the position of seat assembly 500 was lockable and any angle using, for example, a non-back-drivable linear actuator.

As described above, seat assembly 500 includes safety belt system including a lap-belt 570. The safety belt system may also include a shoulder harness (not shown) as known in the harness arts as required or desirable. Belt 570 may, for example, be in operative connection with controller 300 to monitor the status thereof. A lockout system may be included as known in the art to prevent any movement of the workstation access system 10 without lap-belt 570 (and shoulder harness if present) being properly latched. The system hereof may also include one or more engagement indicators (for example, a light, a tone, a tactile indicator etc.) to indicate the state of engagement and/or disengagement of the lap-belt/safety harness. There may also an emergency over-ride to assist a person in exiting system 10.

Seat assembly 500 accommodates a wide range of seat cushions (for example, to facilitate user's personal wheelchair cushion) to ensure safety (for example, to reduce risk of pressure injuries) and comfort throughout the workday (see, for example, FIG. 4). Seat assembly 500 also accommodates multiple styles of backrests (for example, sling upholstery, adjustable tension upholstery, rigid shell upholstered) to meet user needs. Further, seat assembly 500 may be used in connection with a variety of footrests 560 (for example, rigid single platform, rigid dual platform, foldable single platform, foldable dual platform) to meet the needs of various users. A variety of cushions or padding may further be provided for footrest 560 and in connection with extending member 562 (for example, behind the calves of the user).

The robotic seated workstation access system or interface 10 hereof provides for continuous left/right laterally translating movements, vertical positioning through seat elevation, and seat rotation throughout a full range of positions. System 10 provides the occupant access to perform work tasks and use work surfaces in a wide variety of positions within the entire three-dimensional movement space of system 10. System controller 300 may, for example, store three-dimensional trajectories, position, orientation and pose of the seat assembly or system 500 within the entire workspace. Trajectory, position, orientation, and pose can be manually operated, pre-programmed or set by the user in teach mode for repeatable tasks.

System 10 may, for example, include a programmed "home-mode". In such a home mode, through the touch of a button, a flip of switch, a voice command or other simple command, a set of motions of system 10 may be activated with a set of programmed/determined trajectories to bring seat assembly 500 to a position to optimize transfer to/from seat assembly 500 of system 10 into, for example, a person's mobility assistive device (for example, a wheelchair, walker, crutch, scooter). System 10 may also include a programmed "work-mode", which with the touch of a button, a flip of switch, a voice command or other simple command a set of motions of system 10 can be activated with a set of programmed/determined trajectories to bring seat assembly 500 to a position to optimize position, pose, orientation, etc. of seat assembly 500 to begin work operations (see, for example, FIG. 5). A plurality of home, work or other modes may be programmed for different tasks or different users.

As described above, system 10 is built upon a base 20/frame 30 that facilitates transport of the system within a business, factory, or other work environment with the use of a standard pallet jack or overhead lift as illustrated in FIG. 5. Such mobility facilitates multi-person and/or multi-station use and allows ease of installation/removal for people who do not need to use the same workspace or workstation.

System 10 may, for example, include protective covers or shrouds such as a seat assembly/carriage shroud 580 (represented in dashed lines as transparent in FIG. 5) and a frame bellows 90 (represented in dashed lines as transparent in FIG. 5) to minimize risk of injury during movement of system 10 and to help users focus on their work tasks while remaining safe.

System 10 may readily be designed for fail-safe operation. In the case of power loss, system 10 may, for example, remain in the position or state is was in prior to the failure. In a number of embodiments as described above, system 10 includes an uninterruptable power supply with battery back-up unit 400 that engages automatically at the loss of line power and retains all functionality of system 10 for a suitable period of time. In the case of a forced software reboot, system 10 may, for example, maintain the position, orientation, attitude, and pose that it held before the reboot. Such functionality allows the user to be safe in the case of a software or system error. System 10 may also include an emergency stop switch accessible by the user (for example, on controller interface 350) in the case of a catastrophic system failure.

In a number of embodiments, the height of the seat base or plate 520 was adjustable from approximately 19" at its lowest position to accommodate transferring from a manual wheelchair to approximately 34" so the occupant could comfortably reach work height. The lateral travel of the seat was at least approximately 48" to allow for control of equipment and to allow space to transfer into the seat. Additionally, the seat was able to travel this distance in approximately within 7 s. Acceleration control (soft start/soft stop) was employed to achieve this while providing the user comfort. The width of the platform/base was kept to less than approximately 30" to allow the base of the seat to be placed sufficiently close to the equipment to for comfortable arm reach to the equipment controls. The powered footrest was adjustable to from approximately 12" to 17" in length to accommodate people of differing heights. The manually adjustable seat depth was adjustable from approximately 16" to 22". Moreover, the rotation of the seat enabled approximately 180 degrees of rotation in less than 5 s to meet time requirements for the task. As used herein, the term "approximately" means with 10% or with 5% of the stated value.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. An access system to provide access to a workstation, comprising:
- an extending frame configured to be positioned at the workstation;
- a carriage in operative connection with the extending frame;
- a seat support attached to the carriage comprising a seat assembly interface and a lift to raise and lower the seat assembly interface within a range of positions;
- a seat assembly attached to the seat assembly interface,
- a carriage drive in connection with the carriage whereby the carriage may be moved laterally along the extending frame with respect to a forward orientation of a person when seated on the seat assembly to access the workstation to enable the person to translate laterally along the workstation while seated;
- a controller in operative connection with the carriage drive and with the lift of the seat support via which a lateral position and a vertical position of the seat assembly interface is controllable; and
- a controller interface in operative connection with the controller.

2. The access system of claim 1 wherein the seat support comprises a foot rest interface and a foot rest attached to the foot rest interface via an extending member.

3. The access system of claim 2 wherein the foot rest is adjustable in position via adjustment of a length of the extending member and adjustment of an angle of the extending member relative to the seat support via the foot rest interface.

4. The access system claim 1 wherein the seat support comprises a lower frame attached to the carriage and an upper frame attached to the seat assembly interface, the lower frame and the upper frame being connected by the lift.

5. The access system claim 1 wherein the lift of the seat support comprises a scissor lift.

6. The access system of claim 1 wherein the extending frame comprises a first laterally extending member and a second laterally extending member spaced from the first laterally extending member upon with the carriage is laterally movable.

7. The access system of claim 6 wherein at least one of the first laterally extending member and the second laterally extending member comprises a rack gear which cooperates with a gear attached to the carriage, the gear attached to the carriage being in operative connection with the carriage drive.

8. The access system of claim 1 wherein the extending frame comprises adjustable feet and the extending frame is supported by the adjustable feet above a surface contacted by the adjustable feet so forks of a mobile lift system may pass under the extending frame.

9. The access system of claim 1 wherein the seat assembly is pivotably attached to the seat assembly interface so that the seat assembly may be pivoted to the left and to the right of a position in which the seat is oriented perpendicular to a lateral direction of movement of the carriage along the frame.

10. The access system of claim 1 wherein the seat assembly comprises a seat section and a backrest section.

11. The access system of claim 10 wherein the seat section and the backrest section are adjustable in position and in relative angle therebetween.

12. The access system of claim 10 wherein the seat section and the backrest section are adjustable in position and in relative angle therebetween in a powered manner.

13. The access system of claim 1 wherein the seat assembly comprises a safety belt system.

14. The access system of claim 1 wherein the system is powered via electricity and the system further comprises an uninterruptable power supply with battery back-up unit.

15. The access system of claim 1 wherein the controller comprises a processor system and a memory system in operative connection with the processor system.

16. The access system of claim 15 wherein a control algorithm is stored in the memory system and is executable by the processor system.

17. The access system of claim 16 wherein the control algorithm comprises programmed states for at least one of the carriage, the seat support, and the seat assembly.

18. The access system of claim 17 wherein the control algorithm comprises a programmed home state which, when executed, positions the seat support and the seat assembly in a state for exit therefrom by a user.

19. The access system of claim 17 wherein the control algorithm comprises at least one programmed work state which, when executed, positions the seat support and the seat assembly in a state for performance of one or more tasks.

20. A method of providing access to a workstation, comprising:

positioning an access system at the workstation, the access system including:

an extending frame;

a carriage in operative connection with the extending frame;

a seat support attached to the carriage comprising a seat assembly interface and a lift to raise and lower the seat assembly interface within a range of positions;

a seat assembly attached to the seat assembly interface;

a carriage drive in connection with the carriage whereby the carriage may be moved laterally along the extending frame with respect to an orientation of a person when seated on the seat assembly to access the workstation to enable the person to translate laterally along the workstation while seated;

a controller in operative connection with the carriage drive and with the lift of the seat support via which a lateral position and a vertical position of the seat assembly interface is controllable; and a controller interface in operative connection with the controller:

controlling the position of the carriage via the controller interface to move the carriage laterally on the frame; and controlling the lift of the seat support to position the seat assembly interface within a range of vertical positions.

* * * * *